United States Patent Office 3,218,752
Patented Nov. 23, 1965

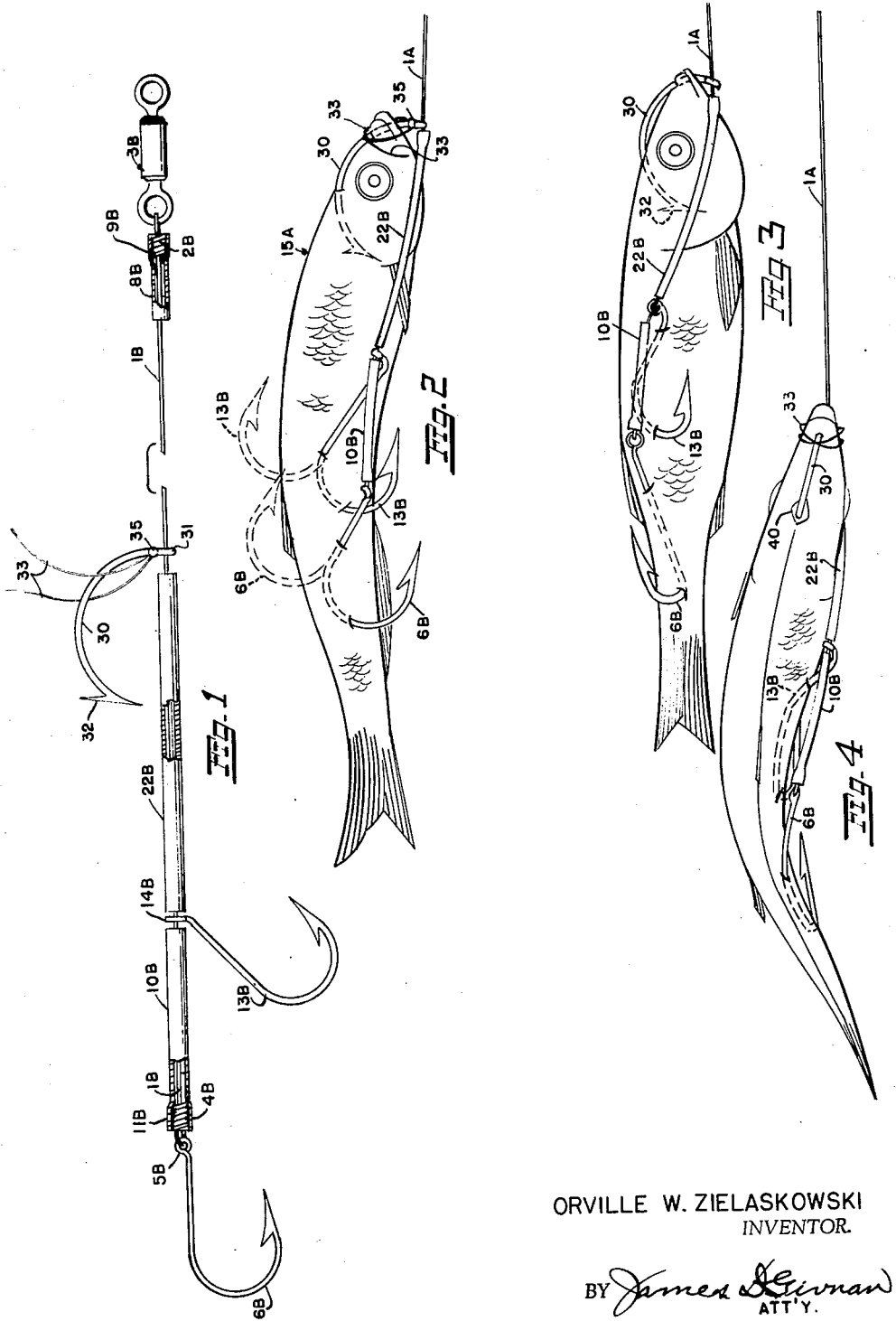

3,218,752
FISHING TACKLE
Orville W. Zielaskowski, 1204 N. 10th St.,
Corvallis, Oreg.
Filed Feb. 24, 1964, Ser. No. 346,724
1 Claim. (Cl. 43—44.2)

This invention relates generally to fishing lures and more particularly to a new and novel combination of a leader, a number of hooks carried by the leader, and tubular elements disposed between the hooks whereby a lure simulating a live herring or similar bait fish can be attached to a fishing line and held in a lifelike position so that when the lure is drawn through the water a lifelike swimming action or motion will be imparted to it.

Another object is the provision of a combination of the character described which will protectively maintain the bait in its lifelike position regardless of how many times it is struck by an attacking fish.

Another object is to hold the lure and the hooks projecting therefrom in such a position that an attacking fish will be hooked when it strikes the lure from any angle.

A further object is to preserve the inherent strength of a leader by eliminating tied knots therein and weak points resulting therefrom. This feature is further enhanced by the tubular elements interposed between the hooks which not only prevent slippage of the hooks along the leader but protect the leader from the bite of a live fish striking the lure.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of fishing tackle made in accordance with my invention.

FIGURES 2 and 3 are views showing a bait fish hooked and held in a lifelike position by the tackle shown in FIGURE 1 and illustrating the fact that the hooks may extend into and outwardly from the body of the bait fish at any desired angle relative thereto, and FIGURE 4 is a similar view.

With continuing reference to the drawing wherein like reference characters designate like parts, reference numeral 1B indicates a monofilament fish leader which may be of any desired length and secured as at 2B to one end of a standard swivel 3B whose opposite end is tied to a fish line not shown. The opposite end of the leader is secured as at 4B to the eye 5B of a fish hook 6B. A bendable plastic tubular element 8B further secures the leader-swivel attachment 2B by stretched engagement therewith as at 9B.

A similar but longer plastic tubular element 10B, having a larger inside diameter than the outside diameter of leader 1B is carried by the opposite or trailing end of the leader and attached by stretched engagement as at 11B with the securement 4B of the leader to the eye of the hook 6B.

The tubular element 10B may be of any desired length to serve as a spacer between the rearmost hook 6B and a forwardly disposed hook 13B which is slidably attached by means of its eye 14B to the leader 1A. A similar second resilient tubular member 22B is also slidably attached to the leader 1B and provides a spacer between hook 13B and a leader-holding hook like member 30 whose shank is formed on a true radius of curvature throughout its length, slidably attached to the leader by its eye 31 and provided with a barb 32 which is on the outside of the curvature at the terminal end of the shank as shown, instead of on the inside thereof as in the conventional type of hooks herein shown at 6B and 13B. A pair of tiewires 33 are secured by soldering or the like as at 35 to the forward end of the shank of member 30 adjacent the eye 31 thereof.

The hooks 6B and 13B can be hooked into the bait fish 15A in any desired manner with their barbed ends extending upwardly or downwardly from the body thereof, as shown in full and dotted lines in FIGURE 2, and still hold a body in the curved lifelike position shown.

For cooperating with the hooks 6B and 13B in holding the bait fish body in its curved position, the shank of the member 30 is thrust upwardly through both jaws of the head as shown in FIGURE 2 and secured thereto by the wrap around wires 33 after the barbed end 32 of member 30 has been inserted downwardly into the head through a characteristic marking of a soft spot 40 thereon (FIGURE 4) if the bait fish is of the herring family.

In FIGURE 3 I dispense with the wrap around wires 33 and insert the hook member 30 upwardly through the jaws and downwardly into the head in the same manner as shown and described in connection with FIGURE 2.

Although I have herein shown and described the lure 15A as the body of a dead bait fish exemplary of the herring family, it is to be understood that the lure may be of the artificial type made of buoyant or nonbuoyant resilient material suitably colored and marked to simulate the body of a dead or alive natural fish of allied species.

From the foregoing it will be readily apparent that I have provided new and novel means for flexing and holding lure bodies of the character described in various curved positions by adjustment or disposition of the hooks relative to the lure body for lifelike appearance and lifelike performance throughout the range of trolling maneuvers wherein a sharp body curve is effective for "mooching," a gentle curve for "slow trolling" or held straight or nearly so for "fast trolling" and wherein the radii of such curvatures are determined by the distance between the rearward hooks and the nose of the lure to which the leader is attached and held by the leader-holding, hook-like member 30, as aforesaid.

Regardless of the body curvature it is to be noted that no hooks appear on the outside curved surface thereof except if so desired as explained in the description of FIGURES 2 and 3. The term "leader" as used herein and indicated at 1, 1A and 1B in the various figures of the drawing comprehends a length of flexible small diameter material of relatively high tensile strength, known commercially as monofilament, nylon, artificial gut leader, and the like. The soft, limp nature of such material, in contrast to stiff wire leaders or the braided wire type, readily lends its terminal ends to tying as at 2, 2B and 4, as aforesaid, or intermediate its ends to fishing lines, swivels, fishing lures, and fish hooks and the like and thus does not interfere with the intended motion of the lure in trolling and similar fishing techniques. The tubular elements maintain the hooks in their spaced relation without the use of knots which would result in weak points within the length of the leader.

The plastic tubular elements 22B not only protect the otherwise exposed portions of the plastic monofilament leader but also yieldingly maintain the hooks in their predetermined set positions relative to each other and hence to the lure body so that the action of the lure when drawn through the water will not be impaired by repeated blows of a live fish striking the lure. The resilient tubular member 8B and the rear end of the tubular member 10B similarly protect the respective securement of the forward end of the leader to the swivel and its rearward end to the trailing hook against slippage or damage and possible wear at these points of securement.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

Fishing tackle comprising a length of monofilament leader having a forward end and a trailing end,
  means attaching the forward end of the leader to a trolling line,
  a bait holding member comprising a shank formed on a true radius of curvature throughout its length slidably attached at one of its ends to said leader and provided with an external barb at its opposite end,
  a first fish hook and means permanently securing said hook to said trailing end of the leader for attaching the fish hook to the rearward end of the bait,
  at least one other fish hook carried by the leader intermediate the ends thereof for attachment to the body of the bait intermediate the ends of said body,
  a resilient tubular member carried by the leader forming a spacer between said fish hooks, and
  said tubular member having an inside diameter larger than the outside diameter of said leader and firmly engaging and protectively enclosing said last named means by a stretched fit thereover whereby said other fish hook is free to be slid forwardly along the leader but restricted in rearward movement by the lengthwise compressive resiliency of said tubular member.

References Cited by the Examiner
UNITED STATES PATENTS

| | | | |
|---|---|---|---|
| 396,246 | 1/1889 | Von Hofe | 43—44.83 |
| 1,286,095 | 11/1918 | Powell | 43—44.4 |
| 2,553,895 | 5/1951 | Carter | 43—44.2 |
| 2,577,466 | 12/1951 | Jones | 43—44.83 X |
| 2,591,764 | 4/1952 | Allen | 43—44.2 |
| 3,130,514 | 4/1964 | Cornick | 43—43.16 X |

FOREIGN PATENTS 39,388  7/1924  Norway.

OTHER REFERENCES

Popular Mechanics, vol. 98, No. 1, July 1952, page 178.

SAMUEL KOREN, *Primary Examiner.*

ABRAHAM G. STONE, *Examiner.*